(No Model.)

E. B. RIPLEY.
Wheel for Animal Traps.

No. 237,601. Patented Feb. 8, 1881.

Witnesses:
M. A. Ripley
F. A. Chamberlin

Inventor:
Eugene B. Ripley

UNITED STATES PATENT OFFICE.

EUGENE B. RIPLEY, OF UNIONVILLE, CONNECTICUT.

WHEEL FOR ANIMAL-TRAPS.

SPECIFICATION forming part of Letters Patent No. 237,601, dated February 8, 1881.

Application filed June 26, 1880. (No model.)

*To all whom it may concern:*

Be it known that I, EUGENE B. RIPLEY, of Unionville, in the town of Farmington, county of Hartford, and State of Connecticut, have invented a new and useful Improvement in Wheels for Animal-Traps, of which the following is a specification.

The invention relates to that class of traps in which a revolving wheel is used, and its object is to simplify the construction of such traps and to lessen the cost of manufacturing the same.

Figure 1:
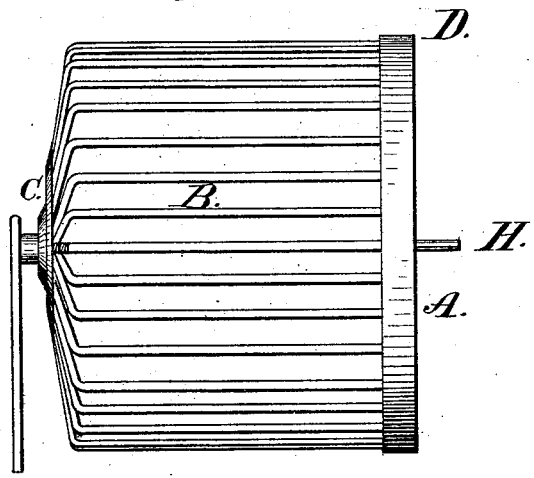
Figure 2:
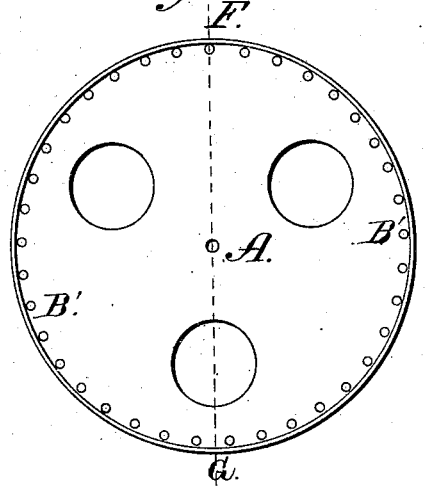
Figure 3:
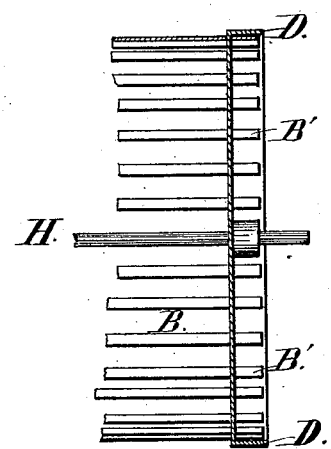

In the accompanying drawings, in which similar letters of reference indicate like parts, Figure 1 is a side view of a wheel embodying my invention. Fig. 2 is a view of the disk or head-plate A, and Fig. 3 is a sectional view of the same plate A through its center upon the line F G.

The body of the wheel is made of tread-wires B, bent near one end in the common form, and united in any of the well-known methods of attachment, or in any other manner, to the binding-plate C. At the other end these tread-wires B are connected with the circular disk or head plate A, and by such connection the wheel is complete.

The plate A is formed from tin-plate or other metal, and has a flange, D, turned, drawn, or pressed around its entire circumference, at right angles with the plane of the surface of the plate. In the surface of this plate A, and in close proximity to the outside or flanged edge D, there is then made a row of perforations or punctures corresponding in number with the tread-wires B. After this preparation the ends B' of the tread-wires B are inserted in these perforations from the convex side of the plate A, the wires thus being made to protrude through the plate A, and terminating at or near the outside edge of the flange D. The perforations in the plate A are purposely made in such proximity to the angle formed by the flange D with the surface of the said plate A that when the ends of the tread-wires B have been passed through the said perforations, they lie touching or very close to the flange D across its whole width. By soldering or otherwise fastening three or more of the wire ends B' to the inside of the flange D, at selected points of its circumference, the whole body of tread-wires is held securely and firmly in place, the inherent rigidity of the other wires holding them in place, they being confined at one end by the binding-plate C. Each wire may be fastened to the flange D, however, if preferred, or if necessity or convenience require.

The perforations of the head-plate A, the insertion of the ends B' of the tread-wires, and other operations may be facilitated, and the cost materially lessened, by the use of mechanism and special devices with the detailed description of which it is unnecessary to encumber this specification.

If preferred, instead of the bent tread-wires B, straight wires may be used, and, instead of the hub-plate C, a disk substantially similar in construction to the head-plate A may be used in connection with the tread-wires and the head-plate A.

The disk A, when used as a head-plate, is provided with the usual openings to admit of ingress and egress.

Both the head-plate A and the hub or binding-plate C are preferably punctured centrally, to admit an axis, H, but may be made with projecting lugs or gudgeons without prejudice to my improvement.

A thin button or washer of wood, metal, or other material may be used to fend the head-plate A and the binding-plate C from the supports of the wheel, or from adjacent parts of the trap.

I desire specifically to disclaim the invention of an animal-trap with revolving wheel, as such; nor do I claim the tread-bars B, nor the binding-plate C, when used without the flanged and perforated head-plate A.

What I claim as new, and desire to secure by Letters Patent of the United States, is—

1. In a wheel for animal-traps, the disk A, flanged and perforated substantially as described.

2. The combination, with the tread-wires B, of the flanged and perforated disk A, substantially as described, and for the purposes set forth.

3. A wheel for an animal-trap, composed of the flanged and perforated disk A, tread-wires B, and binding-plate C, constructed substantially as described, and the parts combined substantially in the manner and for the purposes set forth.

EUGENE B. RIPLEY.

Witnesses:
J. P. CHAMBERLIN,
M. A. RIPLEY.